Dec. 25, 1928.
W. L. PALMER
1,696,859
APPARATUS FOR DEHYDRATING CRUDE OILS
Filed Jan. 31, 1925
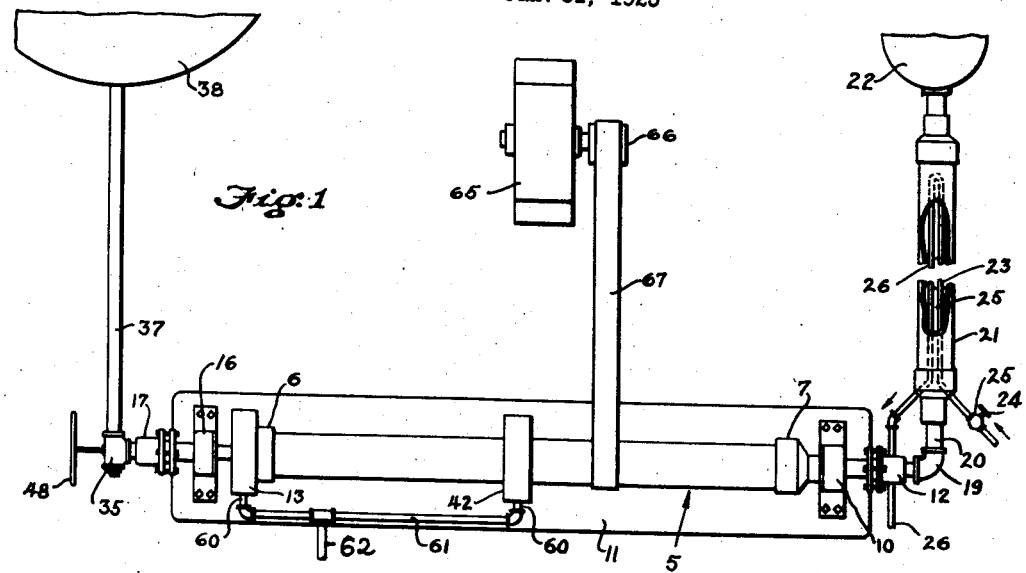
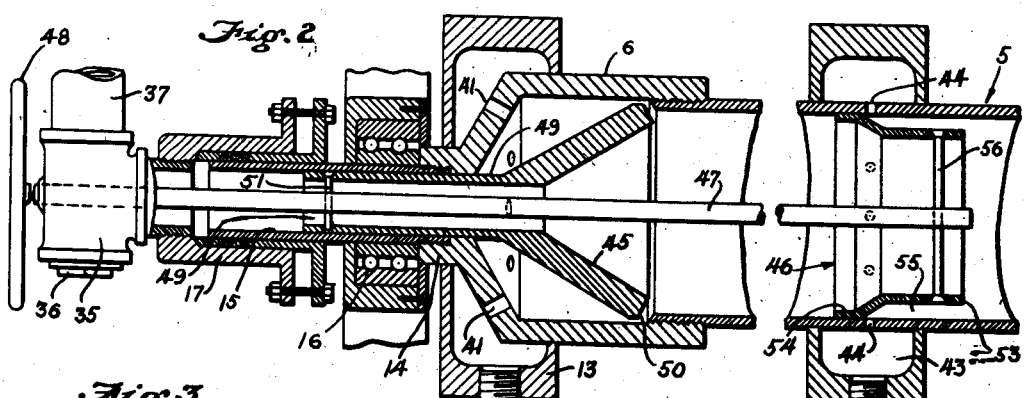
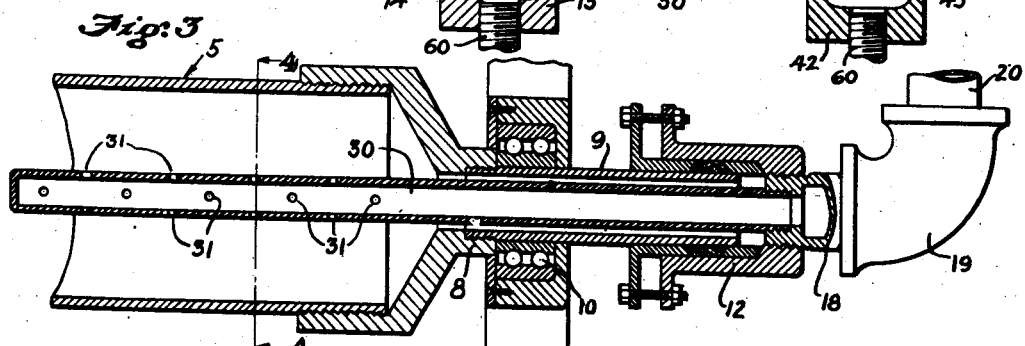
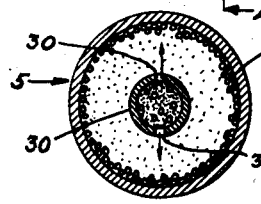
INVENTOR.
WILLIAM L. PALMER
BY
ATTORNEY.

Patented Dec. 25, 1928.

1,696,859

UNITED STATES PATENT OFFICE.

WILLIAM LEE PALMER, OF LONG BEACH, CALIFORNIA, ASSIGNOR OF ONE-HALF TO REGAN FORGE & ENGINEERING COMPANY, OF SAN PEDRO, CALIFORNIA, A CORPORATION OF CALIFORNIA.

APPARATUS FOR DEHYDRATING CRUDE OILS.

Application filed January 31, 1925. Serial No. 6,021.

In crude oils as pumped or otherwise delivered from wells, water in varying amounts is usually associated therewith in an emulsified state. In some wells the oils contain such large percentages of water as to effect their merchantable qualities, and further, when the percentages are large the cost of removing the same is almost prohibitive.

By utilizing the improved apparatus hereinafter described, the water and other foreign matter contained in crude oils may be quickly and economically removed therefrom.

It is a main object of this invention to provide an apparatus for economically removing the water normally associated in petroleum oils as obtained from wells in order to render the same of commercial value, and at the same time to remove the major portion of foreign substances such as sand and dirt therefrom.

A further object is to provide an apparatus in which the crude oils may be effectually treated to dehydrate the same, the apparatus being so arranged that the treatment is continuous.

A still further object is to provide an apparatus for dehydrating crude oils in which the valved water discharge outlets leading therefrom may be quickly and accurately regulated before or during the operation of the apparatus according to the various percentages of water contained in the oils being treated.

In the drawings attached hereto and forming a part of the specification, is illustrated a form of an apparatus that may be conveniently and economically employed in practicing my improved method of removing excess quantities of water from crude oils, in which:

Fig. 1 is a diagrammatic plan view of the separator.

Fig. 2 is an enlarged partial section through the rotary portion of the apparatus.

Fig. 3 is an enlarged detail view of the oil intake end of the apparatus.

Fig. 4 is a cross section of the rotary portion of the apparatus illustrating diagrammatically the method of separating the water from the crude oil.

Referring more specifically to the drawings, the form of apparatus I employ in practicing my method consists broadly of a heating means for the crude oils as delivered from the wells, (the natural gases being first removed therefrom) a rotary drum or cylinder and means for rotating the same, the heated oils being sprayed into the rapidly revolving drum which sets up a centrifugal action of the oils, the denser elements contained in the oils, such as water and other foreign substances, being thrown outwardly from the center of the rapidly revolving mass towards the periphery of the drum, from whence they issue through valve controlled outlet ports and are thence conveyed by pipe lines to tanks for final disposition, the crude oils which are of the lightest density remaining in the center of the drum and passing outwardly through distributing pipes to the storage tanks.

The apparatus as illustrated preferably consists of a hollow cylindrical casing 5, of any desired length and diameter, its ends being exteriorly threaded for the reception of closure heads 6, 7. Closure head 7 is provided with a centrally disposed flanged opening 8, interiorly threaded for the reception of a hollow trunnion 9, that is disposed in an anti-friction bearing 10 rigidly secured to a base plate 11, or other suitable foundation. The end of the trunnion beyond the bearing 10 is disposed in a stuffing box construction 12 of usual form.

Closure head 6 is exactly similar in construction to head 7, except that its cylindrical wall is slightly longer in order to provide space for the operation of a reciprocating valve mounted therein. Secured in threaded engagement with the flanged opening 14 of the head 6, is a hollow trunnion 15 disposed in an anti-friction bearing 16 like the bearing at the opposite end, and is secured to the base plate 11. The end of trunnion 15 is rotated in a stuffing box 17. The open end of stuffing box 12 is threaded interiorly for the reception of a nipple 18 which carries an L-fitting 19, a fluid supply pipe 20 leading therefrom and is connected to a cylindrical heater member 21 adapted to heat the crude oil before it is delivered to the dehydrating casing. The upper end of the heater member 21 communicates with an oil supply tank 22, the crude oil being first passed through a gas trap (not shown) to remove the excess natural gas therefrom. It will be understood that this apparatus will not require settling tanks or any other equipment not here shown, but can be connected up in the pipe lines between tanks and shipping pumps. The crude oil passes from the tank 22 into the heater member 21, which member is provided with a steam coil 23 controlled by a valve 24, the steam coil being of any suitable form, but here shown as consisting of a steam inlet pipe 25 bent at its upper end upon itself to form an outlet pipe 26, the steam inlet pipe 25 being connected to a source of supply (not shown).

The end of nipple 18 which engages the stuffing box 12 is provided with a cylindrical oil discharge pipe 30, the outer end of the pipe being closed and provided in its peripheral wall with a plurality of perforations 31 adapted to discharge the crude oil from the storage tank 22 in the form of a spray to the interior of the dehydrating cylinder. By spraying the crude oil into the cylindrical dehydrating casing 5, the flow of oil to the cylinder will be checked and will start its whirling action at the inlet end of the drum. Further as the discharge pipe 30 is stationary and the drum is rapidly revolving the oil passing through the perforations 31 of pipe 30 under pressure, the water, emulsion and foreign substances will be thrown outwardly toward the peripheral wall of the drum, while the oil being of lighter specific gravity will flow towards the center from one end of the cylinder to the other.

Connected to the stuffing box 17 at the discharge end of the cylinder 5 is a T connection 35, one opening of the T being closed by a plug 36, while its oppositely disposed opening is connected by a pipe 37 to a storage tank 38, or other suitable place of final disposition.

The water discharge member 13 is secured to the base 11 in any suitable manner, and surrounds the outer end of the head 6, a plurality of fluid discharge ports 41 formed in the inclined end wall of the head conducting the water from the casing to the discharge chamber during an operation of the apparatus. A similar chambered water discharge member 42 is secured to the base 11 and surrounds the casing 5, its circular chamber 43 receiving the water separated from the crude oil through a plurality of ports 44 formed in the wall of the casing 5.

In order to control the fluid discharge ports 41, 44, formed in the head 6 and casing 5, a valve control mechanism is provided preferably consisting of a pair of valves 45, 46, having a valve operating rod or stem 47 secured thereto, the outer end of said stem being provided with a hand wheel 48 of usual form. Valve 45 is of conical formation provided at its apex with a hollow cylindrical stem 49 formed integrally therewith and is reciprocatingly mounted within the hollow trunnion 15 of the casing. The peripheral edge 50 of the hollow cone valve is bevelled and engages the bevelled seat on the end of the casing when operated to close the ports in the head that lead to the discharge member 13. Stem 49 is rigidly connected to the valve stem or rod 47 by means of a pin 51 or other suitable connecting means in order that the valve may be reciprocated on an operation of the stem to open or close the ports formed in the casing head. Mounted within the casing 5 adjacent the water discharge chamber 42, is a valve 46, consisting of an open ended cylinder, one end 53 being of less diameter than its other end 54 whose external diameter is slightly less than the internal diameter of the casing. By forming the valve end 53 of less diameter than the internal diameter of the casing an annular passageway 55 is formed between the wall of the valve and casing to the ports 44 formed in the casing and leading to the water discharge chamber. Valve 46 is rigidly secured to the free end of the valve stem by means of a pin 56 in order that it may be reciprocated simultaneously with valve 45, to open and close the fluid discharge ports of the casing.

As the crude oils or emulsions as delivered from the wells contain varying amounts of water, I have found it to be advisable before introducing the same to the dehydrating apparatus to test the same in order to definitely ascertain the percentages of water carried therein. Thus if the oil to be treated is found to contain 25% of water, the valves of the apparatus are pulled forwardly to uncover the ports 44, leading to the water discharge chamber 43, and at the same time unseating the conical valve 45, to permit of a free and unrestricted flow of the water to the ports 41 formed in the casing head 7. Should it be ascertained that the oil to be treated carries only a small percentage of water, say 10%, the ports controlled by the valves 45, 46, are only slightly opened, thus preventing the discharge of valuable oil with the water through the ports.

Each of the water discharge chambers 13, 42, have outlet pipes 60 connected thereto, the pipes being connected by a horizontally disposed pipe 61, having a discharge outlet pipe 62 connected thereto and leading to a sump (not shown), or other convenient place of disposal.

In the drawings a means of rotating the casing is shown as consisting of an electric motor 65 whose pulley 66 is connected by a driving belt 67 to the casing, it being understood that any other convenient and economical means for driving the same may be employed.

In the operation of the apparatus the crude oils are first treated to remove the excess natural gases contained therein by means of a suitable apparatus, such as a gas trap (not shown). The oils are then introduced into the heater 21 by gravity or a force pump depending entirely upon the condition under which the apparatus is operating. The motor 65 is then set in operation to rapidly revolve the casing, the speed of rotation depending entirely upon the gravity of the oils being treated. As the crude oils enter the casing through the perforated pipe 30 they will be sprayed under pressure thereinto at the intake end, the water and foreign substances which are heavier than the oils will be thrown outwardly towards the wall of the casing, while the oils which are of lighter gravity will be caused to flow towards the center of the casing passing forwardly to the outlet end through the sleeve 49, and thence through pipe 37 to the place of final disposition.

From the above it will be apparent that I have provided a simple and efficient apparatus for dehydrating crude oils as produced from the wells, the centrifugal force applied to the oil bodies forcing the water and other foreign matter of greater specific gravity associated therewith outwardly toward the periphery of the revolving mass, where it is discharged through ports, the valuable oils thus freed from the excess water and foreign matter passing to convenient storage receptacles.

The apparatus described is extremely simple in construction and operation, requiring very little attention, as there are only two bearings which may be packed with oil or heavy grease, thus insuring an operation of the apparatus for long periods without requiring attention other than a regulation of the water discharge outlets.

What I claim is:

1. An apparatus for dehydrating crude oils comprising an elongated cylindrical drum and means for rotating the same, means to feed the oils to be treated to said drum, means to preheat the oils before the same are fed to the drum, said drum having water discharge outlets therein, and an oil outlet leading therefrom, and a pair of valves disposed within the drum for controlling the water discharge outlets, whereby the treated oils and water separated thereform will be discharged separately and continuously from the drum during its operation.

2. An apparatus for dehydrating crude oils and removing foreign matter therefrom comprising a cylindrical casing having an oil inlet leading thereto, an elongated perforated pipe connected to said inlet and disposed within said casing for spraying the oil on its introduction thereto, said casing having an oil discharge outlet leading therefrom, valve controlled ports in said casing for controlling the discharge of water dehydrated from the oils on their passage through said casing, and means to rotate said casing.

3. An apparatus for dehydrating crude oils comprising a revoluble cylinder and means for rotating the same, said cylinder having oil inlet and outlet ports and having water discharge ports leading therefrom, valves mounted within the cylinder for regulating the size of said water outlet ports, water discharge chambers enclosing said water discharge ports, and pipe lines leading from said water discharge chambers.

4. An apparatus for removing water and foreign substance from crude oils comprising an elongated cylinder having an oil inlet at one end and an oil discharge outlet at its other end, means to rotate said cylinder, said cylinder having water discharge ports in its cylindrical wall and valve means disposed within the cylinder for controlling the same, said valve means being readily operable during the operation of the apparatus whereby the treated oils will flow through and out the center of the casing while the water separated therefrom will be discharged through the water discharge ports in the wall of said casing.

5. An apparatus for dehydrating crude oils consisting of a revolvable cylinder having fluid inlet and outlet ports, said cylinder having water discharge ports arranged in groups, a pair of reciprocating valves disposed within said cylinder, a valve for each group of discharge ports, and means to reciprocate said valves simultaneously to regulate the size of the ports, the separated oils and water being discharged continuously during the operation of the apparatus.

6. An apparatus for removing water and foreign matter from crude petroleum oils, consisting of a revolvable cylinder having an oil inlet and a discharge outlet, a pipe having a plurality of perforations secured to the oil inlet opening for introducing the oil under pressure into the cylinder in sprayed form, a plurality of water discharge outlets leading from said cylinder, and valves to control said outlets, the discharge of oil and water from the cylinder being continuous during the operation of the apparatus.

In witness that I claim the foregoing I have hereunto subscribed my name this 14th day of January, 1925.

WILLIAM LEE PALMER.